No. 832,868. PATENTED OCT. 9, 1906.
A. M. LORENTZ.
MILKING PAIL.
APPLICATION FILED JULY 12, 1906.

WITNESSES:
Robt F. Dilworth
Claud A. Matheney

INVENTOR
Albert M. Lorentz
By H. E. Dunlap
ATTORNEY

THE NORRIS PETERS CO., WASHINGTON, D. C.

UNITED STATES PATENT OFFICE.

ALBERT M. LORENTZ, OF McMECHEN, WEST VIRGINIA.

MILKING-PAIL.

No. 832,868.                 Specification of Letters Patent.          Patented Oct. 9, 1906.

Application filed July 12, 1906. Serial No. 325,853.

*To all whom it may concern:*

Be it known that I, ALBERT M. LORENTZ, a citizen of the United States of America, and a resident of McMechen, county of Marshall, and State of West Virginia, have invented certain new and useful Improvements in Milking-Pails, of which the following is a specification.

My invention relates to new and useful improvements in milking-pails, and more particularly to a sanitary milking-pail, and still more particularly to a tray or cover for milking-pails.

The object of the invention is to provide a pail for milking purposes having means for excluding therefrom foreign matter or impurities and for preventing such impurities from coming into contact with the milk.

A further object is to provide a simple, durable, and inexpensive cover or tray for buckets or pails which may be readily cleaned and which serves to prevent particles of dust, dirt, or other foreign substance from falling upon that part of the device against which the streams of milk are directed; and a still further object is to provide a device of the character mentioned in which the milk will be twice strained—that is, upon entering the pail and upon being poured therefrom—thus conducing to the further purification of the milk.

The invention finally consists in the particular construction, arrangement, and combination of parts, which will hereinafter be fully described, reference being herein had to the accompanying drawings, forming a part of this specification, in which—

Figure 1:
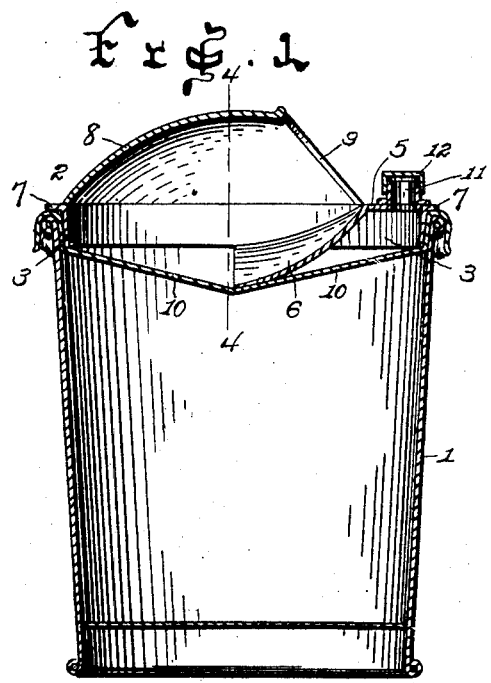
Figure 2:
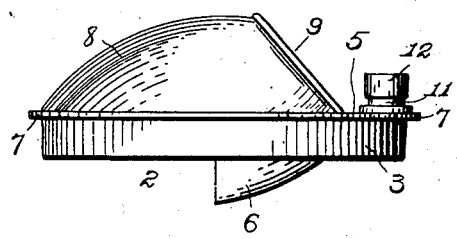
Figure 3:
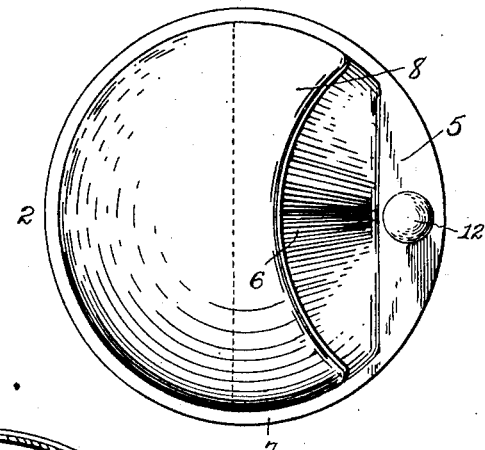
Figure 4:
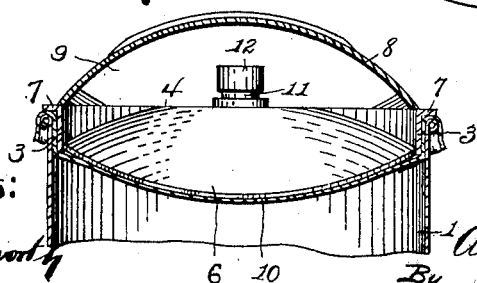

Figure 1 is a central vertical section of the invention. Fig. 2 is a side elevation of the tray. Fig. 3 is a top plan view of the same; and Fig. 4 is a vertical section of the invention, taken at right angles to the section shown in Fig. 1—that is, on the line 4 4, Fig. 1.

Referring to said drawings, in which like reference-numerals designate like parts throughout the several views, 1 indicates the body of the pail, the same being of an ordinary or usual type, while 2 indicates a removable tray. Said tray consists in part of an annular rim 3, adapted for fitting within the pail at its upper edge, a top 4 having a flat horizontal portion 5 at one side, and an inclined concave portion constituting a deflector 6, which ends abruptly at a point substantially midway across the pail. An annular flange 7, integral with the rim 3, is provided for resting upon the edge of the pail and for supporting the tray. A convex arch or hood 8 is mounted upon the top 4 at the inner edge of the flange 7 on the side of the tray opposite to the deflector 6, said arch or hood extending forward and having its front end overlying the end of the deflector, as shown. An inclined opening or aperture 9 is provided in the front end of said hood, through which the streams or jets of milk are directed when milking.

A mesh fabric, preferably sterilized cloth, is spread over the pail-mouth and is stretched and clamped in position between the tray and the pail by the rim 3 when said tray is pressed down, thus forming a diaphragm 10 for straining the milk. The concave edge of the deflector 6 forces the central part of the diaphragm down and holds it most depressed at its center, as is clearly shown in Figs. 1 and 4.

In the flat horizontal portion 5 of the tray, near the edge thereof, is a discharge-spout 11, having a removable cap 12.

As shown in the drawings, the horizontal portion 5 and the deflector 6 cover substantially one-half of the diaphragm 10, excluding therefrom particles of dirt, dust, and other foreign matter, while the convex arch or hood 8 overlies the other half of said diaphragm, protecting it from falling foreign substances.

In milking the streams are directed obliquely through the opening or aperture 9 to the diaphragm 10 in front of the deflector 6, and the milk is strained as it filters through the fabric. Any sediment which remains upon the diaphragm after the milk has been subjected to such straining action is prevented by the edge of the deflector 6, which holds the fabric most depressed at the center, from passing back to that portion of the diaphragm which underlies said deflector. Consequently the latter portion of the diaphragm is kept clean for straining the milk a second time when poured from the pail through the spout 11. In emptying the pail the inclined deflector serves to direct the milk to the spout.

From the foregoing it will be seen that I provide an extremely simple device which not only admits of the milk being strained as it enters the pail, but also when flowing out, and this through different parts of one piece of sterilized fabric. Further, the device serves to protect the straining fabric from impurities not originally carried by the milk. Other advantages of the device not herein mentioned—as, for instance, the prevention of the milk spattering outside the pail—will be apparent to those familiar with or having an intimate knowledge of dairy devices.

Having thus fully described my invention, what I claim as new, and desire to secure by Letters Patent, is—

1. In combination with a pail, a removable tray having a portion fitting therein, a mesh fabric clamped adjacent its edges between said pail and tray, and a part projecting downwardly from said tray to engage said fabric and hold the same taut, said part forming an inlet on one side thereof and an outlet on the opposite side thereof.

2. In combination with a pail, a removable tray having a portion fitting therein, a mesh fabric clamped adjacent its edges between said pail and tray, a hood on said tray extending upwardly, a downwardly-extending deflector carried by the tray and engaging said fabric, said deflector forming an inlet on one side thereof, and an outlet on the opposite side thereof.

3. In combination with a pail, a tray carried thereby and formed with a downwardly-extending deflector to form an inlet on one side thereof, and an outlet on the opposite side thereof, and a straining element extended across said inlet and outlet.

4. In combination with a pail, a tray carried thereby, a convex hood and a concave deflector extending from opposite sides of said tray, and a straining element disposed beneath said deflector and extending throughout the area of the pail.

5. In combination with a pail, a tray carried thereby and formed with a downwardly-extending part to form an inlet on one side and an outlet on the opposite side, and a straining element disposed across said inlet and outlet.

6. In combination with a pail, a tray carried thereby and formed with a hood and a deflector extending in opposite directions to form an inlet, said tray being formed with an outlet beyond said deflector, and a straining element extending across said inlet and outlet.

Signed by me in presence of two subscribing witnesses.

ALBERT M. LORENTZ.

Witnesses:
CLAUD A. MATHENEY,
H. E. DUNLAP.